United States Patent
Miyashita (10) Patent No.: US 9,115,672 B2
(45) Date of Patent: Aug. 25, 2015

(54) CONTROL APPARATUS FOR INTERNAL COMBUSTION ENGINE

(75) Inventor: Shigeki Miyashita, Susono (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 653 days.

(21) Appl. No.: 13/502,646

(22) PCT Filed: Dec. 22, 2009

(86) PCT No.: PCT/JP2009/071332

§ 371 (c)(1),
(2), (4) Date: Apr. 18, 2012

(87) PCT Pub. No.: WO2011/077517

PCT Pub. Date: Jun. 30, 2011

(65) Prior Publication Data

US 2012/0209496 A1  Aug. 16, 2012

(51) Int. Cl.
*F02M 25/07* (2006.01)
*F02D 41/00* (2006.01)
(Continued)

(52) U.S. Cl.
CPC ............ *F02M 25/0713* (2013.01); *F02B 37/18* (2013.01); *F02D 41/0007* (2013.01);
(Continued)

(58) Field of Classification Search
CPC ............. F02D 41/0072; F02D 41/221; F02D 41/0007; F02D 2200/0406; F02M 25/0713; F02M 25/0707; F02M 25/0727; F02B 37/18; F02B 29/0406; Y02T 10/144; Y02T 10/40
USPC ........................ 73/114.3; 701/102, 108, 114
See application file for complete search history.

(56) References Cited

U.S. PATENT DOCUMENTS 6,687,601 B2 * 2/2004 Bale et al. ...................... 701/108
7,631,552 B2 * 12/2009 Keski-Hynnila et al. .. 73/114.74
(Continued)

FOREIGN PATENT DOCUMENTS

JP    4 279752    10/1992
JP    8 61104     3/1996
(Continued)

OTHER PUBLICATIONS

International Search Report Issued Jan. 26, 2010 in PCT/JP09/71332 Filed Dec. 22, 2009.

*Primary Examiner* — Hieu T Vo
*Assistant Examiner* — Sherman Manley
(74) *Attorney, Agent, or Firm* — Oblon, McClelland, Maier & Neustadt, L.L.P.

(57) ABSTRACT

This invention provides a control apparatus for an internal combustion engine that can accurately determine the existence or non-existence of an operational abnormality of a WGV in an internal combustion engine with a turbocharger that is equipped with an EGR system. The internal combustion engine includes a turbocharger, a WGV arranged in an exhaust bypass passage, an EGR valve arranged in an EGR passage, and a pressure sensor that acquires an intake pipe pressure of the internal combustion engine. The existence or non-existence of an operational abnormality of the WGV is determined based on a change in an intake pipe pressure when a valve opening request to the WGV is acquired. At such time, the EGR valve is controlled so as to enter a predetermined open state prior to the valve opening request to the WGV. Further, the existence or non-existence of an operational abnormality of the EGR valve is also jointly determined based on a change in the intake pipe pressure when a valve opening request to the EGR valve is acquired.

6 Claims, 3 Drawing Sheets

(51) Int. Cl.
  *F02D 41/22* (2006.01)
  *F02B 37/18* (2006.01)
  *F02B 29/04* (2006.01)

(52) U.S. Cl.
  CPC ......... *F02D41/221* (2013.01); *F02M 25/0707* (2013.01); *F02B 29/0406* (2013.01); *F02D 2200/0406* (2013.01); *F02M 25/0727* (2013.01); *Y02T 10/144* (2013.01); *Y02T 10/40* (2013.01)

(56) References Cited

U.S. PATENT DOCUMENTS

| | | | | |
|---|---|---|---|---|
| 7,788,922 | B2* | 9/2010 | Muller | 60/602 |
| 2002/0144674 | A1* | 10/2002 | Wang et al. | 123/568.21 |
| 2003/0182048 | A1* | 9/2003 | Wang et al. | 701/107 |
| 2005/0066658 | A1 | 3/2005 | Longnecker et al. | |
| 2006/0248889 | A1* | 11/2006 | Sagisaka et al. | 60/602 |
| 2009/0048802 | A1* | 2/2009 | Wang et al. | 702/138 |
| 2009/0094009 | A1* | 4/2009 | Muller | 703/7 |
| 2012/0185157 | A1* | 7/2012 | Tsunooka | 701/105 |

FOREIGN PATENT DOCUMENTS

| | | |
|---|---|---|
| JP | 9 112316 | 4/1997 |
| JP | 2004 332613 | 11/2004 |
| JP | 2005 106063 | 4/2005 |
| JP | 2005 127231 | 5/2005 |
| JP | 2007 231821 | 9/2007 |
| JP | 2008 95587 | 4/2008 |
| JP | 2008 128114 | 6/2008 |

* cited by examiner

CONTROL APPARATUS FOR INTERNAL COMBUSTION ENGINE

TECHNICAL FIELD

The present invention relates to a control apparatus for an internal combustion engine, and more particularly to a control apparatus for an internal combustion engine with a turbocharger that is equipped with an EGR system.

BACKGROUND ART

A system that detects a closing failure of a wastegate valve (WGV) in an internal combustion engine with a turbocharger is already known, as disclosed for example in Japanese Patent Laid-Open No. 2008-95587. According to this system, an index value is acquired that indicates the degree of an increase in a supercharging pressure in an initial supercharging stage. When the index value is less than a predetermined reference value, it is determined that a closing failure has occurred at the WGV.

Patent Document 1:
Japanese Patent Laid-Open No. 2008-95587
Patent Document 2:
Japanese Patent Laid-Open No. 2007-231821

BRIEF SUMMARY OF THE INVENTION

Problem to be Solved by the Invention

In the above-described conventional system, an abnormality of a WGV is determined based on the degree of an increase in a supercharging pressure in an initial supercharging stage. However, in an internal combustion engine that is equipped with an EGR system, the supercharging pressure varies in accordance with an EGR amount that is recirculated to the intake system. Consequently, in such kind of internal combustion engine equipped with an EGR system, it is not possible to perform an abnormality determination with respect to a WGV based on simply a supercharging pressure characteristic in an initial supercharging stage, and thus room for improvement still remains in this regard.

The present invention has been conceived to solve the above described problem, and an object of the present invention is to provide a control apparatus for an internal combustion engine that can accurately determine the existence or non-existence of an operational abnormality of a WGV in an internal combustion engine with a turbocharger that is equipped with an EGR system.

Means for Solving the Problems

In accomplishing the above object, according to a first aspect of the present invention, there is provided a control apparatus for an internal combustion engine with a turbocharger, comprising:

an exhaust bypass passage that is provided in an exhaust system of the internal combustion engine and that bypasses the turbocharger;

a wastegate valve (hereunder, referred to as "WGV") that is arranged in the exhaust bypass passage and that is capable of arbitrarily opening or closing upon receiving an operation request from the internal combustion engine;

an EGR passage that connects an exhaust passage and an intake passage of the internal combustion engine;

an EGR valve that is arranged in the EGR passage; intake pipe pressure acquisition means that acquires an intake pipe pressure of the internal combustion engine; and WGV abnormality determination means that determines existence or non-existence of an operational abnormality of the WGV based on a change in the intake pipe pressure;

wherein:

the WGV abnormality determination means includes:

valve opening request acquisition means that acquires a valve opening request to the WGV, and EGR valve control means that controls the EGR valve so as to place the EGR valve in a predetermined open state prior to the valve opening request, and the WGV abnormality determination means determines existence or non-existence of an operational abnormality of the WGV based on a change in the intake pipe pressure when the valve opening request is acquired.

According to a second aspect of the present invention, there is provided the control apparatus as described in the first aspect, wherein:

the EGR control means is means that, upon receiving an operation request from the internal combustion engine, causes the EGR valve to move to an open side;

further comprising EGR valve abnormality determination means that determines existence or non-existence of an operational abnormality of the EGR valve based on a change in the intake pipe pressure at a time of executing the EGR control means.

According to a third aspect of the present invention, there is provided the control apparatus as described in the first or second aspect, further comprising:

a bypass passage that is provided in an intake system of the internal combustion engine and that bypasses the turbocharger; and an air bypass valve that is arranged in the bypass passage;

wherein the WGV abnormality determination means is executed in a state in which the air bypass valve is open.

According to a fourth aspect of the present invention, there is provided the system as described in the first or second aspect, further comprising:

fuel cut means that temporarily restricts fuel supplied to the internal combustion engine;

wherein the WGV abnormality determination means is executed during execution of the fuel-cut operation.

Effects of the Invention

According to the first invention, an intake pipe pressure rises in response to an increase in an EGR flow rate. Further, the EGR flow rate increases in proportion to a pressure difference between a pressure at a position that is before an EGR passage and a pressure at a position that is after the EGR passage, that is, a pressure difference between an exhaust pipe pressure and an intake pipe pressure. Therefore, when the wastegate valve (WGV) is opened normally in a state in which the EGR valve is open, the EGR flow rate decreases accompanying a drop in the exhaust pipe pressure, and as a result the intake pipe pressure drops. Therefore, according to the present invention, the existence or non-existence of an operational abnormality of the WGV can be accurately determined based on such a change in the intake pipe pressure.

According to the second invention, when the EGR valve is normally opened and the EGR flow rate increases, the intake pipe pressure rises. Therefore, according to the present invention, the existence or non-existence of an operational abnormality of the EGR valve can be accurately determined based on such a change in the intake pipe pressure.

According to the third invention, the existence or non-existence of an operational abnormality of the WGV is determined in a state in which the air bypass valve (ABV) is open. In a state in which the ABV is open, it is difficult for changes in the intake pipe pressure to occur accompanying turbine supercharging. Therefore, according to the present invention, since the proportion of a change in the intake pipe pressure that depends on the EGR amount increases when the WGV is open, the accuracy of determining an operational abnormality of the WGV can be improved further.

According to the fourth invention, the existence or non-existence of an operational abnormality of the WGV is determined in a state in which a fuel-cut operation is being executed. During a fuel-cut operation, the exhaust gas energy is low, that is, the exhaust pipe pressure is low, and therefore a change is less apt to occur in the number of turbine rotations accompanying opening or closing of the WGV. Therefore, according to the present invention, since the proportion of a change in the intake pipe pressure that depends on the EGR amount increases when the WGV is open, the accuracy of determining an operational abnormality of the WGV can be improved further.

MODE FOR CARRYING OUT THE INVENTION

Hereunder, several embodiments of the present invention are described based on the attached drawings. In this connection, elements that are common to the respective drawings are denoted by the same reference symbols, and a duplicate description thereof is omitted. Further, the present invention is not limited by the following embodiments.

Embodiment 1

[Configuration of Embodiment 1]

Figure 1:
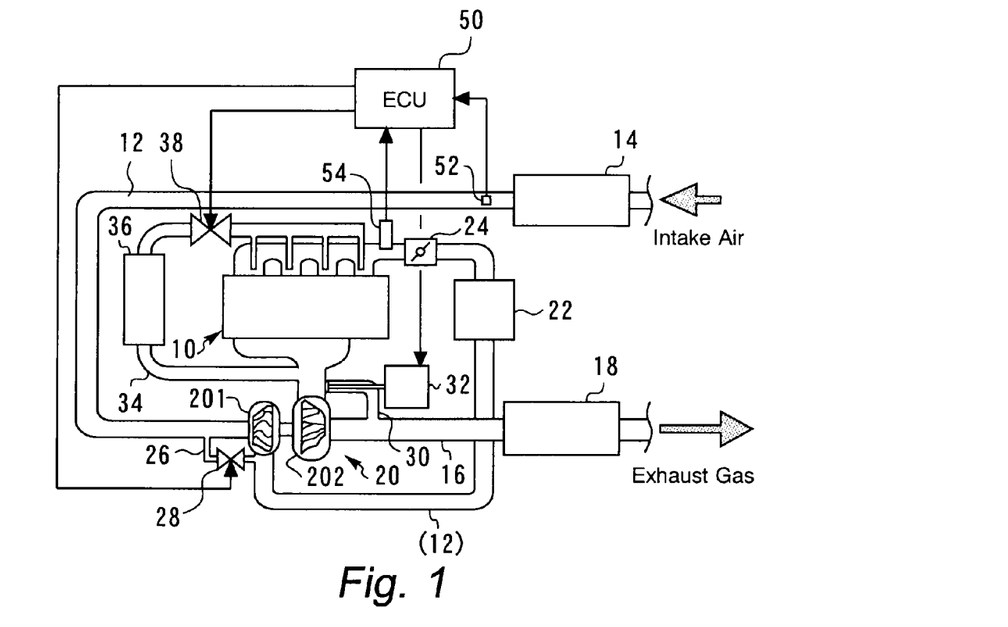
FIG. 1 is a view for describing a system configuration of Embodiment 1 of the present invention.

FIG. 1 is a view for describing a system configuration as Embodiment 1 of the present invention. As shown in FIG. 1, the system of the present embodiment includes an internal combustion engine (engine) 10. An intake system of the internal combustion engine 10 includes an intake passage 12. An air cleaner 14 is mounted in an inlet of the intake passage 12. On a downstream side of the air cleaner 14 in the intake passage 12, an air flow meter 52 is provided for detecting an intake air amount Ga.

A turbocharger 20 is provided at a position that is partway along the intake passage 12. The turbocharger 20 includes a compressor 201 and a turbine 202. The compressor 201 and the turbine 202 are integrally coupled with a connecting shaft. The compressor 201 is rotationally driven by exhaust energy of exhaust gas that is input into the turbine 202. An intercooler 22 for cooling compressed air is arranged on a downstream side of the compressor 201. A throttle valve 24 is arranged on a downstream side of the intercooler 22. A pressure sensor 54 for detecting an intake pipe pressure P is provided on a downstream side of the throttle valve 24. An air bypass passage 26 that connects the inlet side and outlet side of the compressor 201 in a manner that bypasses the compressor 201 is connected to the intake passage 12. An air bypass valve (ABV) 28 is arranged partway along the air bypass passage 26.

An exhaust system of the internal combustion engine 10 includes an exhaust passage 16. The aforementioned turbine 202 of the turbocharger 20 is provided partway along the exhaust passage 16. An exhaust bypass passage 30 that connects the inlet side and outlet side of the turbine 202 in a manner that bypasses the turbine 202 is connected to the exhaust passage 16. An arbitrarily movable wastegate valve (WGV) 32 is arranged partway along the exhaust bypass passage 30. An exhaust purification catalyst 18 for purifying exhaust gas is arranged on a downstream side of the turbine 202. A three-way catalyst can be used as the exhaust purification catalyst 18.

One end of an EGR (Exhaust Gas Recirculation) passage 34 is connected in the vicinity of an intake manifold in the intake passage 12. The other end of the EGR passage 34 is connected in the vicinity of an exhaust manifold in the exhaust passage 16. According to the present system, one portion of exhaust gas (burned gas) can be recirculated to the intake passage 12 through the EGR passage 34, that is, external EGR can be performed. Hereunder, exhaust gas that is recirculated to the intake passage 12 through the EGR passage 34 is referred to as "external EGR gas".

An EGR cooler 36 for cooling external EGR gas is provided partway along the EGR passage 34. An EGR valve 38 is provided on a downstream side of the EGR cooler 36 in the EGR passage 34. The amount of external EGR gas passing through the EGR passage 34 can be adjusted by changing the degree of opening of the EGR valve 38.

As shown in FIG. 1, the system of the present embodiment includes an ECU (Electronic Control Unit) 50. Various kinds of actuators such as the above described WGV 32 and EGR valve 36 are connected to an output portion of the ECU 50. The above described air flow meter 52 and pressure sensor 54 as well as various kinds of sensors for detecting the operating conditions and operating state of the internal combustion engine 10 are connected to an input portion of the ECU 50. The ECU 50 controls the state of the system shown in FIG. 1 based on various kinds of information that is input thereto.

[Operations of Embodiment 1]

Figure 2:
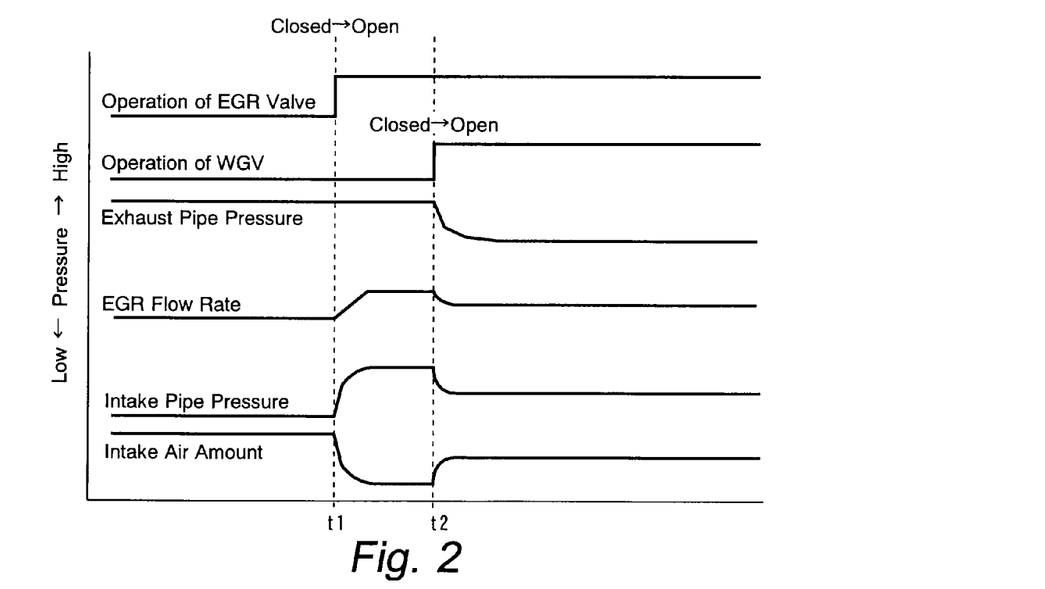
FIG. 2 is a timing chart illustrating the relationship between the degree of opening of the EGR valve 38 and WGV 32 and changes in the EGR flow rate with respect to various states of the internal combustion engine 10.

Next, an operation to determine an operational abnormality of the WGV 32 that is a characteristic operation of Embodiment 1 is described referring to FIG. 2. As described above, the system of Embodiment 1 includes the arbitrarily movable WGV 32. The ECU 50 executes supercharging pressure control according to an operating range of the internal combustion engine 10 using the WGV 32. More specifically, for example, in a region in which a large fuel consumption effect is produced by external EGR, the ECU 50 executes control to close the WGV 32 and increase the back pressure. Further, in a region in which a large fuel consumption effect is produced by reducing the pumping loss, the ECU 50 executes control to open the WGV 32 and lower the back pressure. Thus, by controlling the WGV 32 in accordance with the operating range of the internal combustion engine 10, it is possible to enhance fuel consumption and improve emissions.

In this connection, if an operational abnormality occurs at the WGV 32, the above described supercharging pressure control cannot be executed normally and it is assumed that this leads to a deterioration in emissions or a deterioration in fuel consumption. It is thus desirable to detect an operational abnormality of the WGV 32 at an early stage and with certainty. In this respect, a measure may be considered that involves mounting a position detecting sensor in the WGV 32 to confirm operation of the WGV 32. However, the addition of a new sensor causes problems in terms of installation space and increased cost.

In this case, in the internal combustion engine 10 equipped with the EGR system, the intake pipe pressure changes in accordance with an EGR flow rate. The EGR flow rate changes according to the degree of opening of the EGR valve 38 and the degree of opening of the WGV 32. FIG. 2 is a timing chart illustrating the relationship between the degree of opening of the EGR valve 38 and WGV 32 and changes in the EGR flow rate with respect to various states of the internal combustion engine 10. As shown in FIG. 2, when the EGR valve 38 is opened at a time t1, the EGR flow rate that is recirculated to the intake pipe increases. Consequently, the exhaust pipe pressure rises rapidly at the time t1.

Thereafter, when the WGV 32 is opened at a time t2, the exhaust pipe pressure drops. When the exhaust pipe pressure drops, the pressure difference between the exhaust pipe pressure and the intake pipe pressure decreases. Therefore, as shown in FIG. 2, the EGR flow rate decreases at the time t2. As a result, the intake pipe pressure drops at the time t2 at which the EGR flow rate decreases.

Thus, when the WGV 32 is opened normally in a state in which the EGR valve 38 is open, the intake pipe pressure drops. Therefore, according to Embodiment 1, changes in the intake pipe pressure are utilized to determine whether or not an operational abnormality of the WGV 32 has occurred. More specifically, in a state in which the EGR valve 38 has been opened to a predetermined degree of opening, a valve opening request is sent to the WGV 32. If the intake pipe pressure drops after the valve opening request, it is determined that the WGV 32 has been opened normally. In contrast, if the intake pipe pressure does not change after the valve opening request, it is determined that the WGV 32 has not been opened normally. It is thereby possible to determine the existence or non-existence of an operational abnormality of the WGV 32 with a simple configuration.

In this connection, preferably, the above described determination of an operational abnormality of the WGV 32 is performed in a state in which the ABV 28 is open. More specifically, in a state in which the ABV 28 is open, a change in the intake pipe pressure that is caused by a change in the number of rotations of the compressor 201 is less apt to occur. Accordingly, since the influence of a change in the intake pipe pressure that is caused by supercharging can be suppressed by opening the WGV 32 in a state in which the ABV 28 is open, a change in the intake pipe pressure that is caused by a change in the EGR flow rate can be accurately detected. Thus, the accuracy of determining an abnormality of the WGV 32 can be effectively increased.

Further, the above described determination of an abnormality of the WGV 32 is preferably performed during a fuel-cut operation of the internal combustion engine 10. More specifically, since the exhaust gas energy is low during a fuel-cut operation, a change in the number of rotations of the turbine 202 is less apt to occur when the WGV 32 is opened or closed. Accordingly, when the WGV 32 is opened during a fuel-cut operation, since the influence of a change in the intake pipe pressure caused by supercharging can be suppressed, a change in the intake pipe pressure that is caused by a change in the EGR flow rate can be accurately detected. Thus, the accuracy of determining an abnormality of the WGV 32 can be effectively increased.

[Specific Processing in Embodiment 1]

Figure 3:
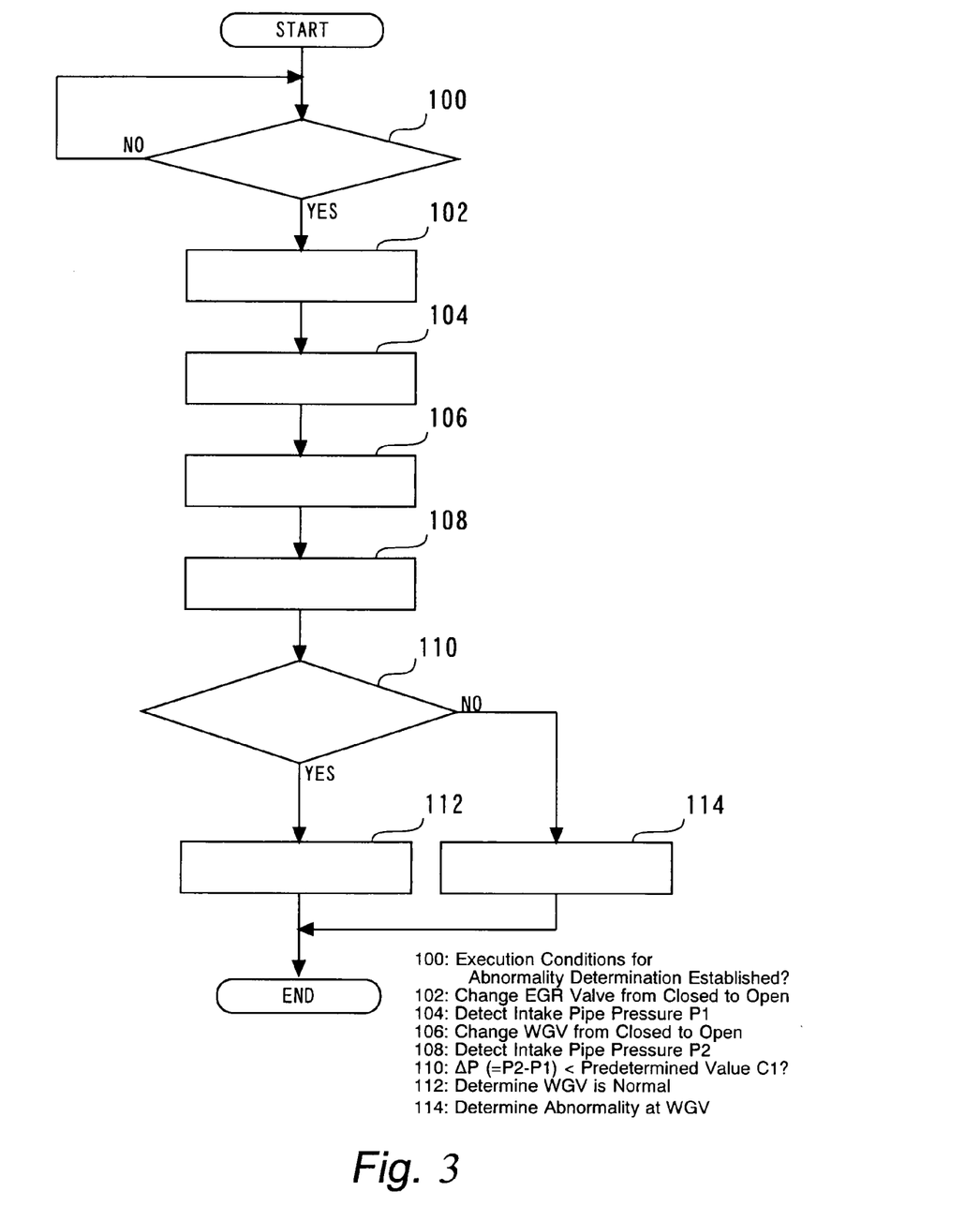
FIG. 3 is a flowchart illustrating a routine executed in Embodiment 1 of the present invention.

Next, the specific contents of processing executed according to the present embodiment are described referring to FIG. 3. FIG. 3 is a flowchart of a routine that the ECU 50 executes.

In the routine shown in FIG. 3, first the ECU 50 determines whether or not execution conditions for determining an operational abnormality of the WGV 32 are established (step 100). In this case, specifically, the ECU 50 determines whether or not the internal combustion engine 10 is in a predetermined steady operation state, whether or not the EGR valve 38 is closed, and whether or not the WGV 32 is closed. If the ECU 50 determines as a result that these conditions are not yet established, the ECU 50 repeatedly executes this step.

In contrast, if the ECU 50 determines in the aforementioned step 100 that execution conditions for determining an abnormality are established, next, the EGR valve 38 is opened to a predetermined degree of opening (step 102). The intake pipe pressure rises when the EGR valve 38 is opened. In the subsequent step, based on a detection signal of the pressure sensor 54, the ECU 50 acquires an intake pipe pressure P1 after the EGR valve 38 has opened (step 104).

Next, a request to open the WGV 32 is acquired (step 106). When the WGV 32 is opened normally, the intake pipe pressure drops. In the subsequent step, based on a detection signal of the pressure sensor 54, the ECU 50 acquires an intake pipe pressure P2 after the WGV 32 has opened (step 108).

Next, the ECU 50 determines whether or not a pressure difference ΔP between the intake pipe pressure before opening the WGV 32 and the intake pipe pressure after opening the WGV 32 is less than a predetermined value C1 (step 110). In this case, specifically, first a difference between the intake pipe pressure P2 detected in the aforementioned step 108 and the intake pipe pressure P1 detected in the aforementioned step 104 is calculated as ΔP. Next, the ECU 50 determines whether or not the value ΔP is less than the predetermined value C1. A value (negative value) that is previously set as the intake pipe pressure change amount when the WGV 32 opens normally is used as the predetermined value C1. If it is determined as a result that ΔP<C1, the ECU 50 determines that the WGV 32 has opened normally, and that the WGV 32 is operating normally (step 112). In contrast, in the aforementioned step 110, if it is determined that the relationship ΔP<C1 does not hold, the ECU 50 determines that the WGV 32 has not opened normally, and that an operational abnormality has occurred at the WGV 32 (step 114).

As described above, according to the system of the present embodiment 1, the WGV 32 is opened in a state in which the EGR valve 38 is open. It is thereby possible to detect a change in the intake pipe pressure that corresponds to actual operation of the WGV 32, and hence the accuracy of determining an operational abnormality of the WGV 32 can be effectively increased.

In this connection, although in the above described Embodiment 1 a configuration is adopted that determines an operational abnormality of the WGV 32 based on a change in the intake pipe pressure at the time of a request to open the WGV 32, a value used for determining such an operational abnormality is not limited to the intake pipe pressure. More specifically, as shown in FIG. 2, when the intake pipe pressure changes, the intake air amount Ga also changes in accompaniment therewith. Therefore, a configuration may also be adopted in which intake air amounts before and after a valve opening request is sent to the WGV 32 are acquired based on detection signals from the air flow meter 52, and the existence or non-existence of an operational abnormality at the WGV 32 is determined based on the amount of change between the aforementioned intake air amounts.

Further, although in the above described Embodiment 1 a configuration is adopted that determines an operational abnormality of the WGV 32 based on a pressure difference ΔP between the intake pipe pressures before and after a valve opening request is sent to the WGV 32, a value used for determining such an operational abnormality is not limited to ΔP. More specifically, as long as the existence or non-existence of an actual operation of the WGV 32 can be determined, a rate of decrease in the intake pipe pressure or the like may also be used.

Note that, in the above described Embodiment 1, the pressure sensor 54 corresponds to "intake pipe pressure acquisition means" of the above described first invention. Further, the "EGR valve control means" of the first invention is realized by the ECU 50 executing the processing of the aforementioned step 102, the "valve opening request acquisition means" of the first invention is realized by the ECU 50 executing the processing of the aforementioned step 106, and the "WGV abnormality determination means" of the first invention is realized by the ECU 50 executing the processing of the aforementioned step 110.

Embodiment 2

[Features of Embodiment 2]

Figure 4:
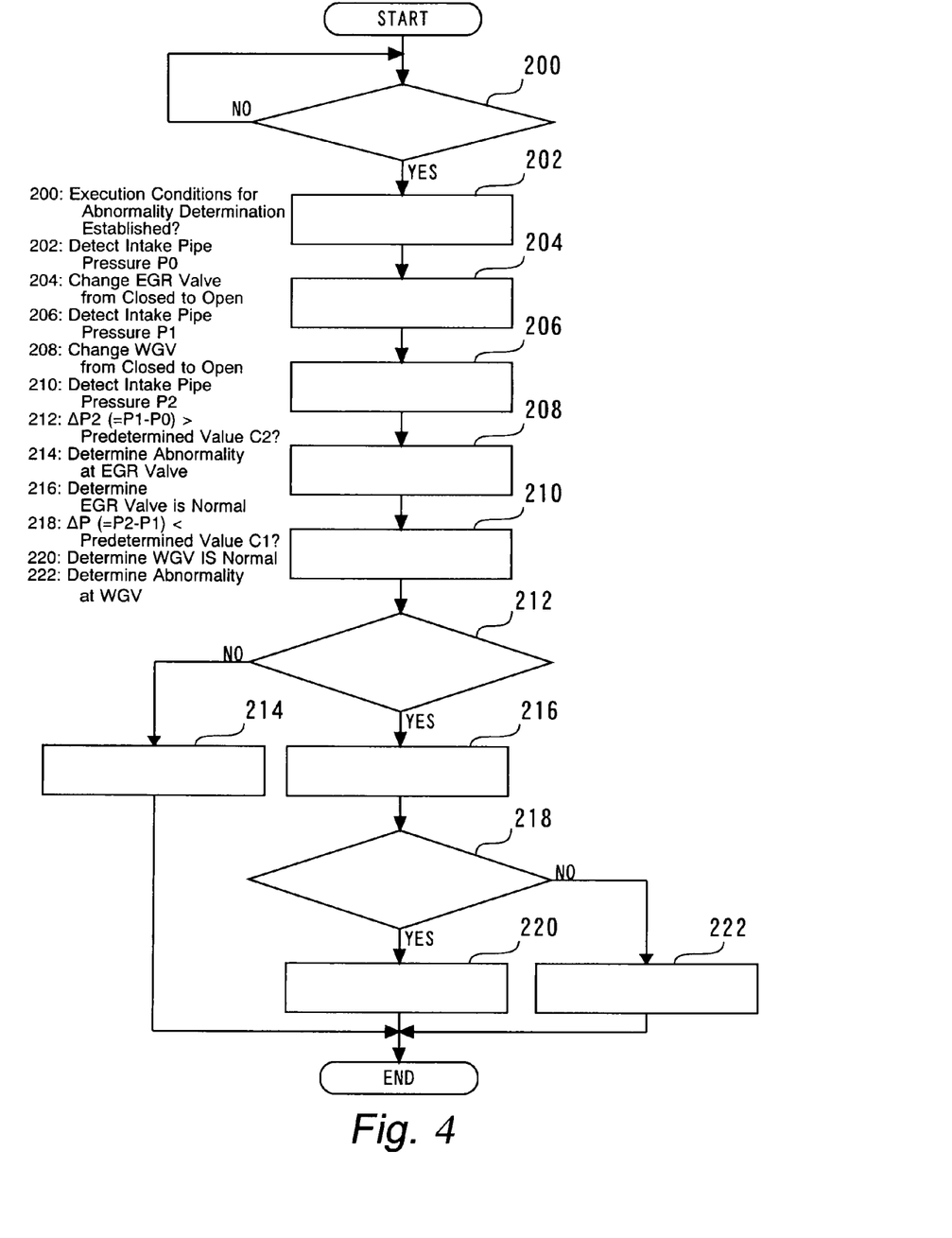
FIG. 4 is a flowchart illustrating a routine executed in Embodiment 2 of the present invention.

Next, Embodiment 2 of the present invention is described referring to FIG. 4. The system of the present embodiment can be implemented by causing the ECU 50 to execute a routine shown in FIG. 4, described later, using the hardware configuration shown in FIG. 1.

According to the system of Embodiment 1 that is described above, when determining the existence or non-existence of an operational abnormality at the WGV 32, first the EGR valve 38 is opened to a predetermined degree of opening. In this case, as shown in FIG. 2, when the EGR valve 38 is opened normally in a state in which the WGV 32 is open, the intake pipe pressure rises. This is because, as described above, the EGR flow rate increases when the EGR valve 38 is opened.

Therefore, according to Embodiment 2, a configuration is adopted that determines the existence or non-existence of an operational abnormality at the EGR valve 38 based on a change in the intake pipe pressure with respect to the pressures before and after a valve opening request is sent to the EGR valve 38. More specifically, when executing an operation to determine an operational abnormality at the WGV 32, the intake pipe pressures before and after sending a valve opening request to the EGR valve 38 are detected. If a pressure difference between these intake pipe pressures does not reach a predetermined threshold value, it is determined that an operational abnormality has occurred at the EGR valve 38. Thus, an operational abnormality of the EGR valve 38 can also be determined in addition to determining an operational abnormality of the WGV 32. Furthermore, according to this procedure, although the intake pipe pressure rises when performing a determination with regard to the EGR valve 38, the intake pipe pressure drops when performing a determination with regard to an abnormality of the WGV 32. Therefore, even when an interval between operating the EGR valve 38 and operating the WGV 32, that is, an interval between the time t1 and the time t2 is shortened, abnormality detection can be performed with high accuracy.

[Specific Processing in Embodiment 2]

Next, the specific contents of processing executed according to the present embodiment are described referring to FIG. 4. FIG. 4 is a flowchart of a routine that the ECU 50 executes.

In the routine shown in FIG. 4, first, the ECU 50 determines whether or not execution conditions for determining an operational abnormality of the WGV 32 are established (step 200). In this case, specifically, the ECU 50 executes the same processing as in the above described step 100. If the ECU 50 determines as a result that these conditions are not yet established, the ECU 50 repeatedly executes this step. In contrast, if the ECU 50 determines in the aforementioned step 200 that execution conditions for determining an abnormality are established, next, an intake pipe pressure P0 is detected based on a detection signal of the pressure sensor 54 (step 202).

Next, a request to open the EGR valve 38 is acquired (step 204). Subsequently, based on a detection signal of the pressure sensor 54, the ECU 50 acquires an intake pipe pressure P1 after the EGR valve 38 has opened (step 206). Next, a request to open the WGV 32 is acquired (step 208). Subsequently, based on a detection signal of the pressure sensor 54, the ECU 50 acquires an intake pipe pressure P2 after the WGV 32 has opened (step 208). In this case, specifically, the ECU 50 executes the same processing as in the above described steps 102 to 108.

Next, the ECU 50 determines whether or not a pressure difference ΔP2 (P1−P0) between the intake pipe pressure before the valve opening request to the EGR valve 38 and the intake pipe pressure after the valve opening request to the EGR valve 38 is greater than a predetermined value C2 (step 212). In this case, specifically, first, a difference between the intake pipe pressure P1 detected in the aforementioned step 206 and the intake pipe pressure P0 detected in the aforementioned step 202 is calculated as ΔAP2. Next, the ECU 50 determines whether or not the value ΔAP2 is greater than the predetermined value C2. A value (positive value) that is previously set as the intake pipe pressure change amount when the EGR valve 38 opens normally is used as the predetermined value C2. If it is determined as a result that the relationship ΔAP2>C2 does not hold, the ECU 50 determines that the EGR valve 38 has not opened normally, and that operation of the EGR valve 38 is abnormal (step 214). When an operational abnormality of the EGR valve 38 is confirmed, the present routine ends because it is not possible to accurately determine an operational abnormality of the WGV 32 thereafter.

In contrast, if it is determined in the aforementioned step 212 that ΔAP2>C2, the ECU 50 determines that the EGR valve 38 has opened normally, and that operation of the EGR valve 38 is normal (step 216). According to the routine shown in FIG. 4, next, the ECU 50 determines whether or not a pressure difference ΔP between the intake pipe pressure before opening the WGV 32 and the intake pipe pressure after opening the WGV 32 is less than the predetermined value C1 (step 218). In this case, specifically, the ECU 50 executes the same processing as in the above described step 110. If it is determined as a result that ΔP<C1, the ECU 50 determines that the WGV 32 has opened normally, and that the WGV 32 is operating normally (step 220). In contrast, in the aforementioned step 218, if it is determined that the relationship ΔP<C1 does not hold, the ECU 50 determines that the WGV 32 has not opened normally, and that an operational abnormality has occurred at the WGV 32 (step 222).

As described above, according to the system of Embodiment 2, when determining the existence or non-existence of an operational abnormality at the WGV 32, the existence or non-existence of an operational abnormality at the EGR valve 38 can be determined at the same time.

In this connection, although in the above described Embodiment 2 a configuration is adopted that determines an operational abnormality of the EGR valve 38 based on a change in the intake pipe pressure at the time of a valve opening request to the EGR valve 38, a value used for determining such an operational abnormality is not limited to an intake pipe pressure. More specifically, as shown in FIG. 2, when the intake pipe pressure changes, the intake air amount Ga also changes in accompaniment therewith. Therefore, a configuration may also be adopted in which intake air amounts before and after a valve opening request is sent to the EGR valve 38 are acquired based on detection signals from the air flow meter 52, and the existence or non-existence of an operational abnormality at the EGR valve 38 is determined based on the amount of change between the aforementioned intake air amounts.

Further, although in the above described Embodiment 2 a configuration is adopted that determines an operational abnormality of the EGR valve 38 based on a pressure difference $\Delta AP2$ between the intake pipe pressures before and after a valve opening request is sent to the EGR valve 38, a value used for determining such an operational abnormality is not limited to $\Delta AP2$. More specifically, as long as the existence or non existence of an actual operation of the EGR valve 38 can be determined, a rate of increase in the intake pipe pressure or the like may also be used.

Note that, in the above described Embodiment 2, the pressure sensor 54 corresponds to "intake pipe pressure acquisition means" of the above described first invention. Further, the "EGR valve control means" of the first invention is realized by the ECU 50 executing the processing of the aforementioned step 204, the "valve opening request acquisition means" of the first invention is realized by the ECU 50 executing the processing of the aforementioned step 208, and the "WGV abnormality determination means" of the first invention is realized by the ECU 50 executing the processing of the aforementioned step 218.

Furthermore, in the above described Embodiment 2, the "EGR valve abnormality determination means" of the second invention is realized by the ECU 50 executing the processing of the aforementioned step 212.

DESCRIPTION OF REFERENCE CHARACTERS

10: internal combustion engine
12: intake passage
14: air cleaner
16: exhaust passage
18: exhaust purification catalyst (three-way catalyst)
20: turbocharger
201: compressor
202: turbine
22: intercooler
24: throttle valve
26: air bypass passage
28: An air bypass valve (ABV)
30: exhaust bypass passage
32: wastegate valve (WGV)
34: EGR passage
36: EGR cooler
38: EGR valve
50: ECU (electronic control unit)
52: air flow meter
54: pressure sensor

The invention claimed is:

1. A control apparatus for an internal combustion engine with a turbocharger, comprising:
   an exhaust bypass passage that is provided in an exhaust system of the internal combustion engine and that bypasses the turbocharger;
   a wastegate valve (hereunder, referred to as "WGV") that is arranged in the exhaust bypass passage and that is capable of arbitrarily opening or closing upon receiving an operation request from the internal combustion engine;
   an EGR passage that connects an exhaust passage and an intake passage of the internal combustion engine;
   an EGR valve that is arranged in the EGR passage;
   intake pipe pressure acquisition means that acquires an intake pipe pressure of the internal combustion engine; and
   WGV abnormality determination means that determines existence or non-existence of an operational abnormality of the WGV based on a change in the intake pipe pressure;
   wherein:
   the WGV abnormality determination means includes:
      EGR valve control means that controls the EGR valve so as to place the EGR valve in a predetermined open state,
      first intake pipe pressure obtaining means that obtains a first intake pipe pressure from the intake pipe pressure acquisition means when the EGR valve is in the predetermined open state,
      valve opening request acquisition means that acquires a valve opening request to the WGV in a state in which the EGR valve is open,
      second intake pipe pressure obtaining means that obtains a second intake pipe pressure from the intake pipe pressure acquisition means when the EGR valve is open and the valve opening request to the WGV is acquired,
      pressure difference calculating means that calculates a difference between the first intake pipe pressure and the second intake pipe pressure, and
      comparing means which compares the difference between the first intake pipe pressure and the second intake pipe pressure to a predetermined value, and
   the WGV abnormality determination means determines existence an operational abnormality of the WGV if the difference between the first intake pipe pressure and the second intake pipe pressure is greater than or equal to the predetermined value.

2. The control apparatus for an internal combustion engine according to claim 1, wherein:
   the EGR valve control means is means that, upon receiving an operation request from the internal combustion engine, causes the EGR valve to move to an open side, and
   the control apparatus further comprises EGR valve abnormality determination means that determines existence or non-existence of an operational abnormality of the EGR valve based on a change in the intake pipe pressure at a time of executing the EGR valve control means.

3. The control apparatus for an internal combustion engine according to claim 1, further comprising:
   a bypass passage that is provided in an intake system of the internal combustion engine and that bypasses the turbocharger; and
   an air bypass valve that is arranged in the bypass passage, wherein the WGV abnormality determination means is executed in a state in which the air bypass valve is open.

4. The control apparatus for an internal combustion engine according to claim 1,
   wherein the WGV abnormality determination means is executed during execution of a fuel-cut operation of the internal combustion engine.

5. The control apparatus for an internal combustion engine with a turbocharger, comprising:
   an exhaust bypass passage that is provided in an exhaust system of the internal combustion engine and that bypasses the turbocharger;
   a wastegate valve (hereunder, referred to as "WGV") that is arranged in the exhaust bypass passage and that is capable of arbitrarily opening or closing upon receiving an operation request from the internal combustion engine;

an EGR passage that connects an exhaust passage and an intake passage of the internal combustion engine;

an EGR valve that is arranged in the EGR passage;

intake pipe pressure acquisition device that acquires an intake pipe pressure of the internal combustion engine; and WGV abnormality determination device that determines existence or non-existence of an operational abnormality of the WGV based on a change in the intake pipe pressure;

wherein:

the WGV abnormality determination device includes:
- an EGR valve control device that controls the EGR valve so as to place the EGR valve in a predetermined open state,
- a first intake pipe pressure obtaining device that obtains a first intake pipe pressure from the intake pipe pressure acquisition device when the EGR valve is in the predetermined open state,
- a valve opening request acquisition device that acquires a valve opening request to the WGV in a state in which the EGR valve is open,
- a second intake pipe pressure obtaining device that obtains a second intake pipe pressure from the intake pipe pressure acquisition device when the EGR valve is open and the valve opening request to the WGV is acquired,
- a pressure difference calculating device that calculates a difference between the first intake pipe pressure and the second intake pipe pressure, and
- a comparing device which compares the difference between the first intake pipe pressure and the second intake pipe pressure to a predetermined value, and the WGV abnormality determination device determines existence of an operational abnormality of the WGV if the difference between the first intake pipe pressure and the second intake pipe pressure is greater than or equal to the predetermined value.

6. The control apparatus for an internal combustion engine according to claim 1, wherein:

the WGV abnormality determination means includes execution state determining means that determines whether or not execution conditions for determining the existence of the operational abnormality of the WGV are satisfied based on:
- whether or not the internal combustion engine is in a predetermined operation state,
- whether or not the EGR valve is closed, and
- whether or not the WGV is closed.

* * * * *